US012226066B2

(12) United States Patent
Reiland et al.

(10) Patent No.: US 12,226,066 B2
(45) Date of Patent: Feb. 18, 2025

(54) VACUUM FOR USE WITH MODULAR STORAGE SYSTEM

(71) Applicant: Milwaukee Electric Tool Corporation, Brookfield, WI (US)

(72) Inventors: Fraizier Reiland, Myrtle Beach, SC (US); Jonathan M. Mantes, Franklin, WI (US); Donghai Liu, Dongguan (CN); Baiyuan Huang, Huanggang (CN); Fang Cheng, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1029 days.

(21) Appl. No.: 17/126,536

(22) Filed: Dec. 18, 2020

(65) Prior Publication Data

US 2021/0145227 A1 May 20, 2021

Related U.S. Application Data

(63) Continuation of application No. PCT/US2020/051259, filed on Sep. 17, 2020.

(30) Foreign Application Priority Data

Nov. 15, 2019 (CN) ........................ 201921987794.X

(51) Int. Cl.
*A47L 9/00* (2006.01)
*A47L 5/36* (2006.01)
(Continued)

(52) U.S. Cl.
CPC ............. *A47L 9/0027* (2013.01); *A47L 5/365* (2013.01); *A47L 7/0019* (2013.01); *B25H 3/02* (2013.01)

(58) Field of Classification Search
CPC ...... A47L 9/0027; A47L 5/365; A47L 7/0019; A47L 7/0028; A47L 7/0042;
(Continued)

(56) References Cited

U.S. PATENT DOCUMENTS 5,608,945 A 3/1997 Crouser et al.
6,059,141 A * 5/2000 Wojnowski ............. B60R 11/06 220/849

(Continued)

FOREIGN PATENT DOCUMENTS

DE 19750543 5/1999
DE 102004063214 7/2006

(Continued)

OTHER PUBLICATIONS

International Search Report and Written Opinion for International Application No. PCT/US2020/051259, Dated Dec. 15, 2020, 14 pages.

*Primary Examiner* — David Redding
(74) *Attorney, Agent, or Firm* — Reinhart Boerner Van Deuren s.c.

(57) ABSTRACT

A vacuum that couples to storage units is provided. The vacuum includes a motor, an internal compartment, and an inlet and outlet that provide fluid communication between the internal compartment and an exterior of the vacuum. The vacuum includes one or more mechanisms to protect internal components from water damage and to prevent debris from escaping the internal compartment when the vacuum is being transported.

14 Claims, 11 Drawing Sheets

(51) Int. Cl.
*A47L 7/00* (2006.01)
*B25H 3/02* (2006.01)

(58) Field of Classification Search
CPC .... A47L 9/0018; A47L 9/0036; A47L 9/0045; A47L 9/2884; A47L 7/0004; B25H 3/02
See application file for complete search history.

(56) References Cited

U.S. PATENT DOCUMENTS

| | | | | |
|---|---|---|---|---|
| 6,578,937 | B1 * | 6/2003 | Thoman | B25H 3/028 312/902 |
| 6,883,202 | B2 | 4/2005 | Steffen et al. | |
| 6,912,757 | B2 | 7/2005 | Kaufman et al. | |
| 7,000,287 | B2 | 2/2006 | Valentini | |
| 7,263,742 | B2 | 9/2007 | Valentini | |
| 8,689,396 | B2 | 4/2014 | Wolfe et al. | |
| 10,583,962 | B2 | 3/2020 | Brunner et al. | |
| 2003/0208874 | A1 | 11/2003 | Steffen et al. | |
| 2004/0111825 | A1 | 6/2004 | Kaufman et al. | |
| 2007/0241113 | A1 * | 10/2007 | Williams | B25H 3/02 220/523 |
| 2008/0115312 | A1 | 5/2008 | DiPasquale et al. | |
| 2008/0271280 | A1 | 11/2008 | Tiede et al. | |
| 2017/0165828 | A1 | 6/2017 | Fleischmann | |
| 2017/0166352 | A1 | 6/2017 | Hoppe et al. | |
| 2018/0220861 | A1 | 8/2018 | Zhang et al. | |
| 2019/0225371 | A1 | 7/2019 | Hoppe et al. | |
| 2020/0147781 | A1 | 5/2020 | Squiers et al. | |
| 2020/0165036 | A1 | 5/2020 | Squiers et al. | |
| 2021/0147113 | A1 * | 5/2021 | Workman | B65D 55/16 |
| 2022/0203382 | A1 | 6/2022 | Grebing | |

FOREIGN PATENT DOCUMENTS

| | | | |
|---|---|---|---|
| DE | 102014010378 | | 1/2016 |
| EP | 0916302 | | 5/1999 |
| EP | 1321247 | A2 | 6/2003 |
| EP | 2805799 | | 11/2014 |
| EP | 2829209 | | 1/2015 |
| EP | 2829210 | | 1/2015 |
| EP | 2829211 | | 1/2015 |
| WO | WO 2005-055794 | | 6/2005 |
| WO | WO2018/188736 | | 10/2018 |

* cited by examiner

VACUUM FOR USE WITH MODULAR STORAGE SYSTEM

CROSS-REFERENCE TO RELATED PATENT APPLICATION

The present application is a continuation of International Application No. PCT/US2020/051259, filed on Sep. 17, 2020, which claims the benefit of and priority to Chinese Utility Model Application No. 201921987794.X, filed on Nov. 15, 2019, which are incorporated herein by reference in their entireties.

BACKGROUND OF THE INVENTION

The present disclosure is directed generally to the field of tool storage systems and related devices. The present disclosure relates specifically to a device or tool storage container that includes a vacuum and a coupling mechanism to detachably couple the device or tool storage container to another device or container, such as in a modular tool storage system.

Tool storage units are often used to transport tools and tool accessories. Some storage units are designed to incorporate into a modular storage system. Within a modular storage system, different units, devices and/or containers may provide varying functions, such as being adapted to vacuum debris and waste.

SUMMARY OF THE INVENTION

According to one embodiment, this disclosure relates to a vacuum including a motor, a housing that defines an internal compartment, the housing defining an inlet through which debris enters the internal compartment when the motor is operating, and the housing further defining an outlet through which air exits the internal compartment when the motor is operating, the inlet and the outlet being in fluid communication with an exterior of the housing, the housing including an interface configured to couple the vacuum to a modular tool storage device, an inlet stopping mechanism configured to interrupt fluid communication between the internal compartment and the exterior of the housing via the inlet when the motor is not operating, the inlet stopping mechanism being biased towards sealing the inlet, and an outlet stopping mechanism configured to interrupt fluid communication between the internal compartment and the exterior of the housing via the outlet when the motor is not operating, the outlet stopping mechanism being biased towards sealing the outlet.

According to another embodiment, this disclosure relates to a vacuum including a motor, a housing that defines an internal compartment, the housing defining an inlet through which debris enters the internal compartment when the motor is operating, and the housing further defining an outlet through which air exits the internal compartment when the motor is operating, the inlet and the outlet being in fluid communication with an exterior of the housing, and the housing including an interface configured to couple the vacuum to a modular tool storage device, an outlet stopping mechanism configured to interrupt fluid communication between the internal compartment and the exterior of the housing via the outlet when the motor is not operating, and a seal disposed between the outlet stopping mechanism and the housing.

According to another embodiment, this disclosure relates to a modular storage system including a vacuum and a storage unit. The vacuum includes a top surface, a plurality of coupling mechanisms located along the top surface, a motor, a housing that defines an internal compartment, the housing defining an inlet through which debris enters the internal compartment when the motor is operating, and the housing further defining an outlet through which air exits the internal compartment when the motor is operating, the inlet and the outlet being in fluid communication with an exterior of the housing. The storage unit includes a surface, a second plurality of coupling mechanisms located along the surface, one or more of the second plurality of coupling mechanisms being configured to detachably engage with the plurality of coupling mechanisms of the vacuum, and a housing defining a storage compartment.

According to another embodiment, this disclosure relates to a vacuum configured to be coupled to a tool storage device, and the vacuum includes a base, a top panel opposite the base, and a housing. The housing defines a plurality of drain holes that provide fluid communication between an exterior of the housing and an internal compartment of the vacuum. In a specific embodiment the internal compartment is in fluid communication with a battery bay. In a specific embodiment, the base and top panel include interface(s) to couple the vacuum to other components, such as modular tool storage devices.

According to another embodiment, this disclosure relates to a vacuum including a base, a top panel opposite the base, a housing, an inlet stopping mechanism, such as a float, and an outlet stopping mechanism, such as a float. The housing defines an internal compartment. The housing defines an inlet through which debris enters the internal area when the vacuum is operating, and an outlet through which air exits the internal area when the vacuum is operating. The inlet and outlet are in fluid communication with an exterior of the housing. The inlet stopping mechanism is configured to interrupt fluid communication between the internal compartment and the exterior of the housing via the inlet when the vacuum is not in operation. The outlet stopping mechanism is configured to interrupt fluid communication between the internal compartment and the exterior of the housing via the outlet when the vacuum is not in operation. In a specific embodiment one or both of the stopping mechanisms are biased towards sealing their respective inlet or outlet opening.

According to another embodiment, this disclosure relates to a vacuum including a base, a top panel opposite the base, a housing, an outlet stopping mechanism, and a seal. The housing defines an internal compartment. The housing defines an inlet through which debris enters the internal compartment when the vacuum is operating, and an outlet through which air exits the internal compartment when the vacuum is operating. The inlet and the outlet are in fluid communication with an exterior of the housing. The outlet stopping mechanism is configured to interrupt fluid communication between the internal compartment and the exterior of the housing when the vacuum is not in operation. The seal is disposed between the outlet stopping mechanism and the housing so that it interfaces against both.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Figure 1:
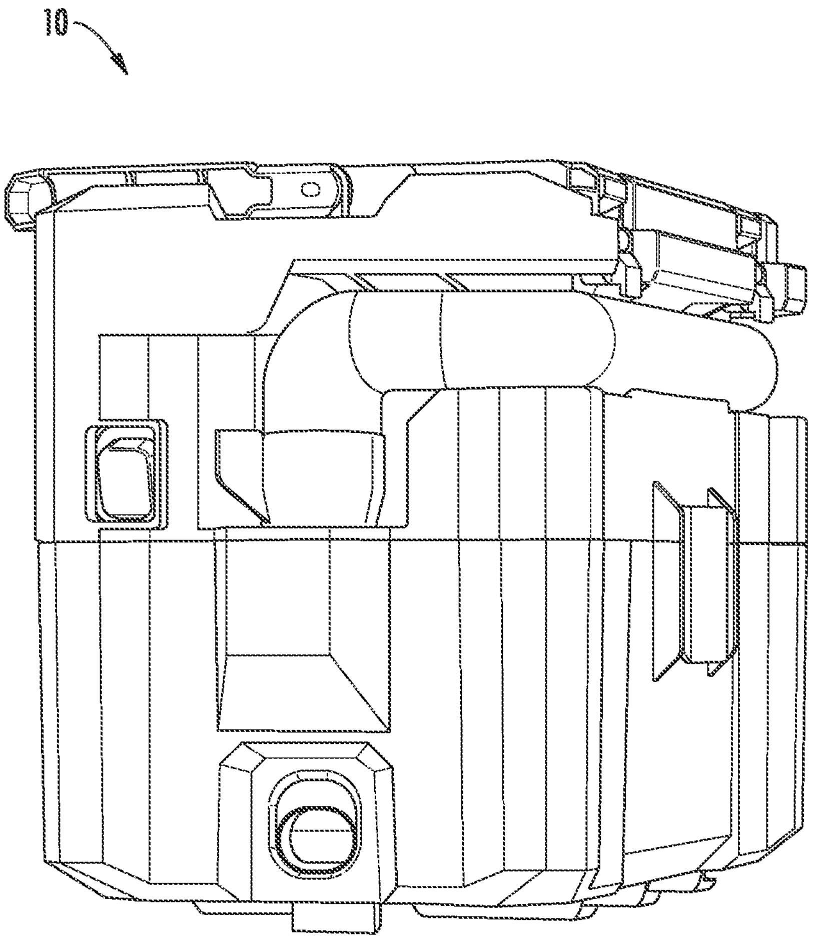
FIG. 1 is a perspective view of a vacuum, according to an exemplary embodiment.
Figure 2:
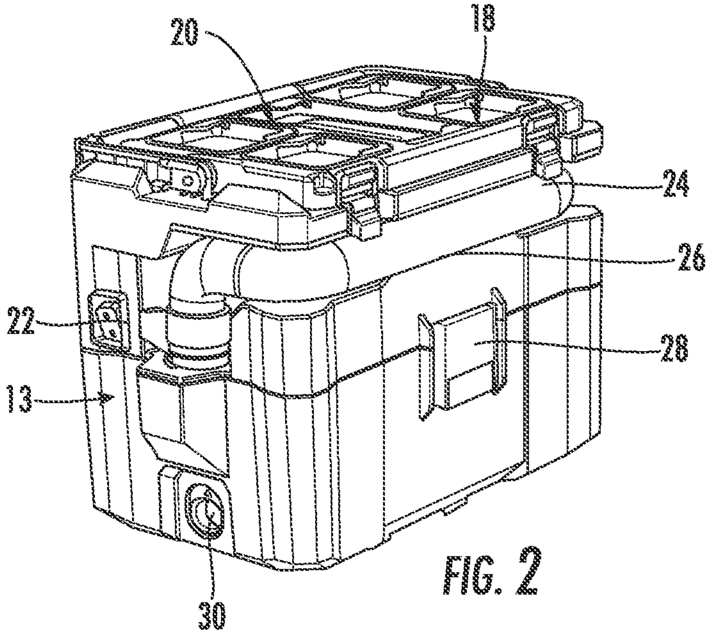
FIG. 2 is a perspective view from above of the vacuum of FIG. 1, according to an exemplary embodiment.
Figure 3:
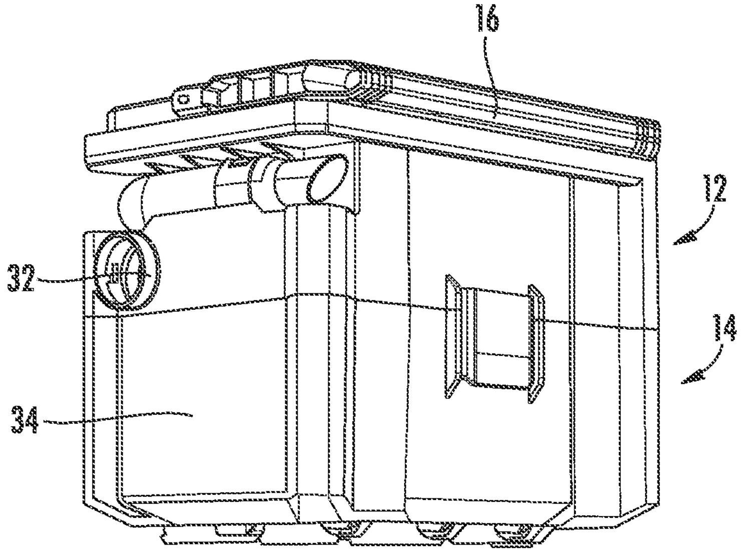
FIG. 3 is a perspective view of the vacuum of FIG. 1, according to an exemplary embodiment.
Figure 4:
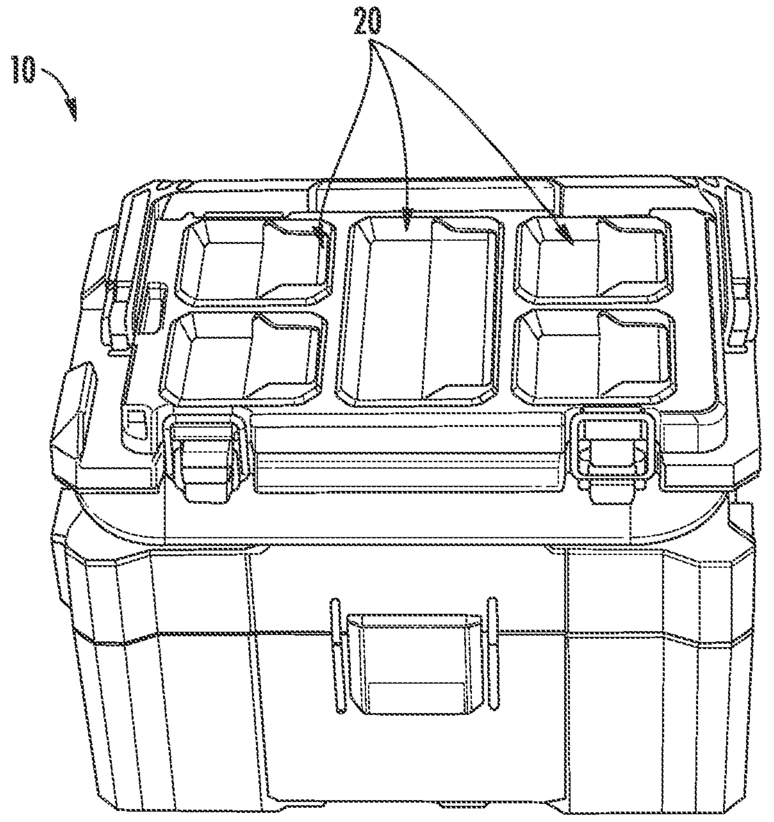
FIG. 4 is a perspective view from above of the vacuum of FIG. 1, according to an exemplary embodiment.
Figure 5:
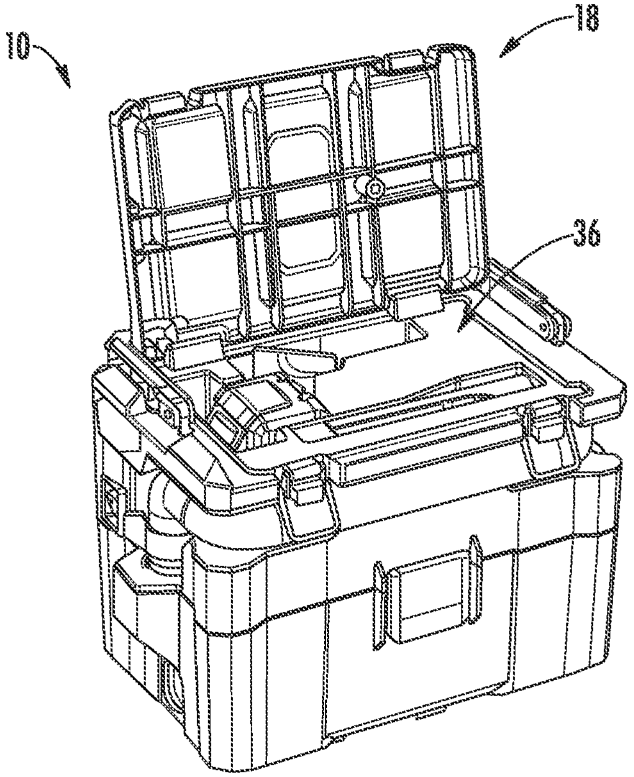
FIG. 5 is a perspective view from above of the vacuum of FIG. 1, according to an exemplary embodiment.
Figure 6:
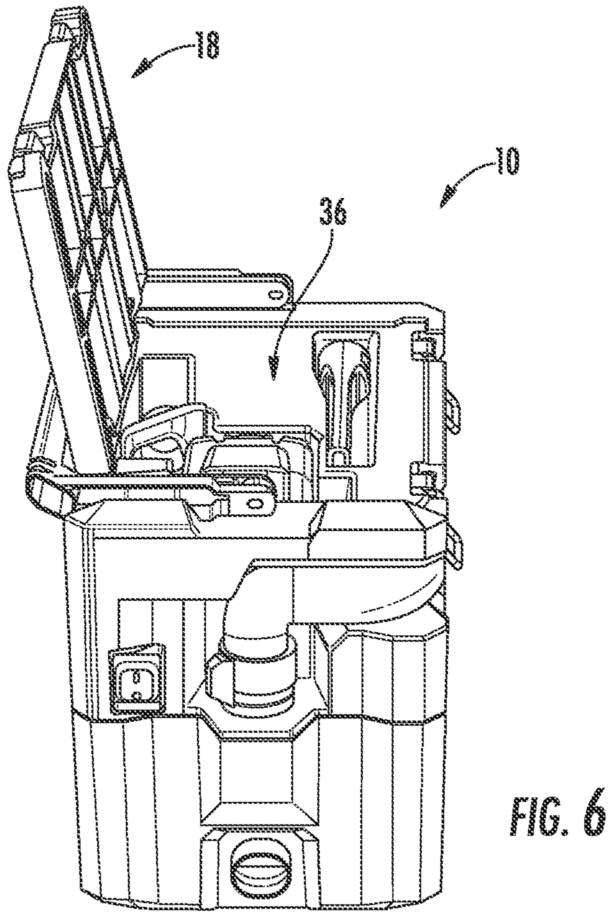
FIG. 6 is a perspective view from above of the vacuum of FIG. 1, according to an exemplary embodiment.
Figure 7:
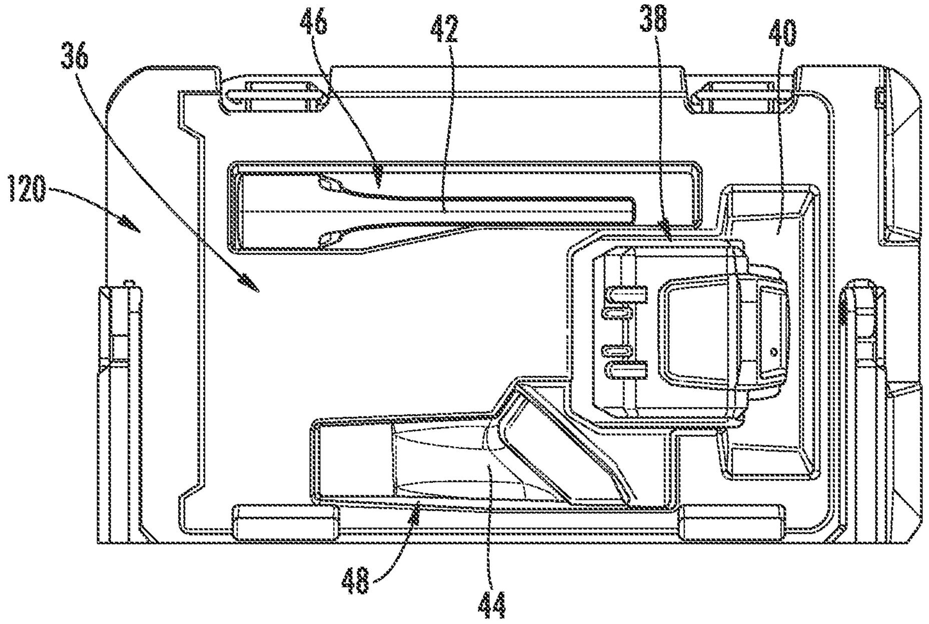
FIG. 7 is a detailed top view of the vacuum of FIG. 1, according to an exemplary embodiment.

Referring generally to the figures, various embodiments of a stackable tool storage related device, container or unit are shown. One or more of the devices are configured to selectively couple and decouple with storage units. In a specific embodiment, a vacuum that can be used to collect and store waste is provided with modular coupling structures that allow for the vacuum to be coupled to/stacked with the stackable tool storage related devices. As compared to a vacuum unit that does not incorporate into a modular storage system, one advantage of this design is the vacuum unit can be easily transported with other modular storage units. As discussed in more detail below, the modular vacuum discussed herein includes one or more feature, such as liquid drains, an inlet sealing component, and an outlet sealing component, etc., that Applicant has determined provide for a variety of advantages for a vacuum used with a modular tool storage system.

Referring to FIGS. 1-4, a device for suctioning debris and liquids, depicted as vacuum 10, is shown according to an exemplary embodiment. Switch 22 controls the operation of a motor of the vacuum 10, such as toggling whether the vacuum 10 is operating (e.g., turned on or off). Top panel 18 is secured to upper housing 12 via top lid latch 24, and upper housing 12 and lower housing 14 are detachably secured together via canister latch 28. When vacuum 10 is not in use and/or vacuum 10 is being transported, hose 26 is secured to upper housing 12.

Top panel 18 includes interface 20 that permits vacuum 10 to couple to a modular storage unit via an interface compatible with the coupling mechanism(s) described in International Patent Application No. PCT/US2018/044629. In a specific embodiment a bottom surface of housing 12 includes coupling interfaces that are configured to couple the housing 12 to a modular tool storage device and/or unit. In another specific embodiment, a storage device that includes features described in this disclosure has coupling interfaces on both the top and bottom that permit the storage device to couple to a modular storage unit via an interface compatible with the coupling mechanism(s) described in International Patent Application No. PCT/US2018/044629, which is incorporated by reference in its entirety. A locking device, shown as lock 30 secures vacuum 10 to another modular storage unit that vacuum 10 is placed on.

Handle 16 is pivotally coupled to upper housing 12, and permits the carrying of vacuum 10. Vacuum 10 ejects air through blower port 32, and the debris gathered by vacuum 10 is stored in an internal storage area, shown as compartment 34. In the specific embodiment shown, compartment 34 has a volume capacity of two gallons, although other volumes could be utilized and still practice this disclosure.

In various embodiments, two or more of switch 22, lock 30, and hose 26 are coupled to the same face of upper housing 12 of vacuum 10. As an example, in a specific embodiment switch 22 is coupled to a first face 13 of vacuum 10 and hose 26 is coupled to the first face 13 of vacuum 10. As another example, in a specific embodiment lock 30 is coupled to a first face 13 of vacuum 10 and switch 22 is coupled to the same first face 13 of vacuum 10. This positioning permits easier and more intuitive interactions, while permitting positioning of vacuum 10 on other modular storage units so that each of switch 22, lock 30, and hose 26 are fully accessible.

Turning to FIGS. 5-10, various aspects of vacuum 10 are shown. Top panel 18 is pivotally coupled to upper housing 12. When top panel 18 is pivotally opened, panel 36 and additional storage compartments, shown as second compartments 40, 46 and 48 are exposed and accessible. Housing 12 and panel 36 collectively define several internal storage compartments, shown as compartments 40, 46 and 48 that house battery 38, vacuum crevice tool 42, and vacuum utility tool 44, respectively. In a specific embodiment battery 38 provides power to the motor to activate the vacuum. When top panel 18 is closed and affixed above upper housing 12, top panel 18 protects battery 38, vacuum crevice tool 42, and vacuum utility tool 44 from damage and debris.

Figure 8:
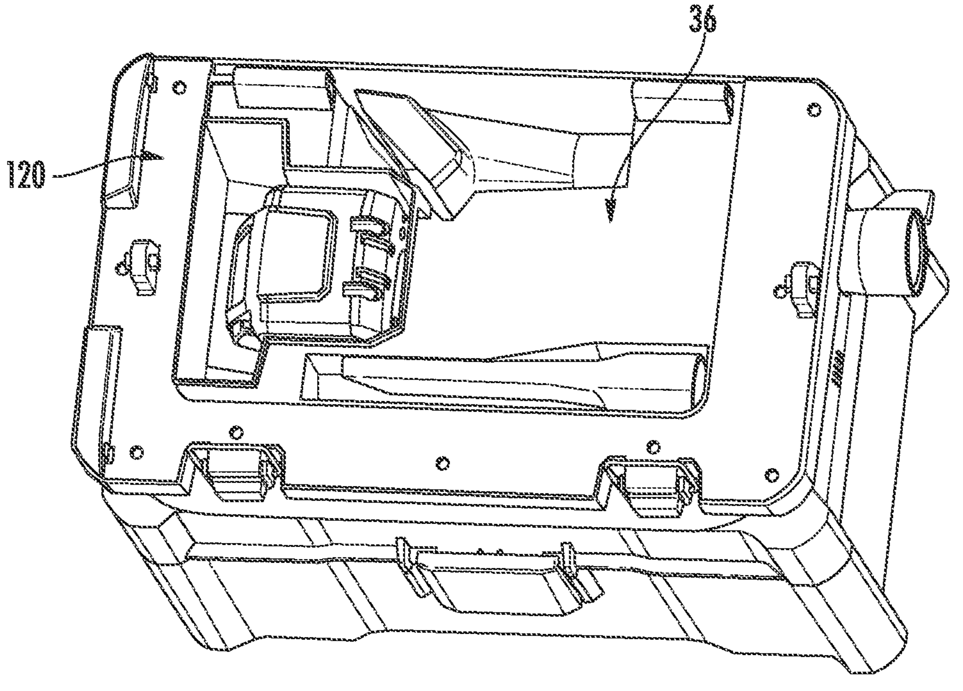
FIG. 8 is a perspective view of the vacuum of FIG. 1, according to an exemplary embodiment.
Figure 9:
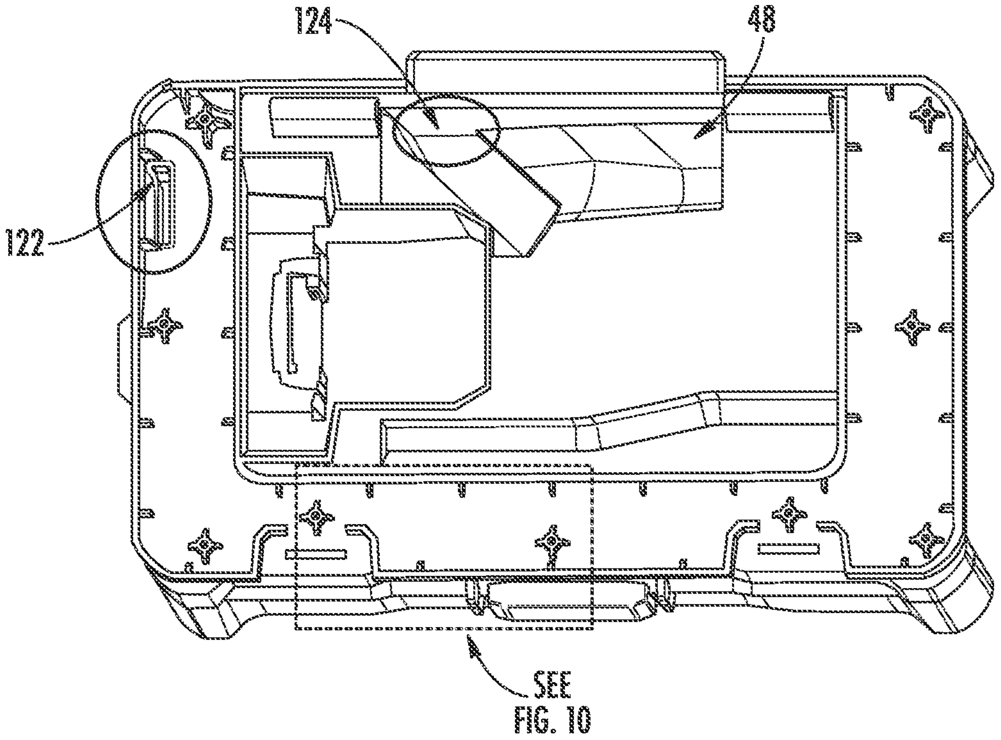
FIG. 9 is a perspective view of the vacuum of FIG. 1, according to an exemplary embodiment.
Figure 10:
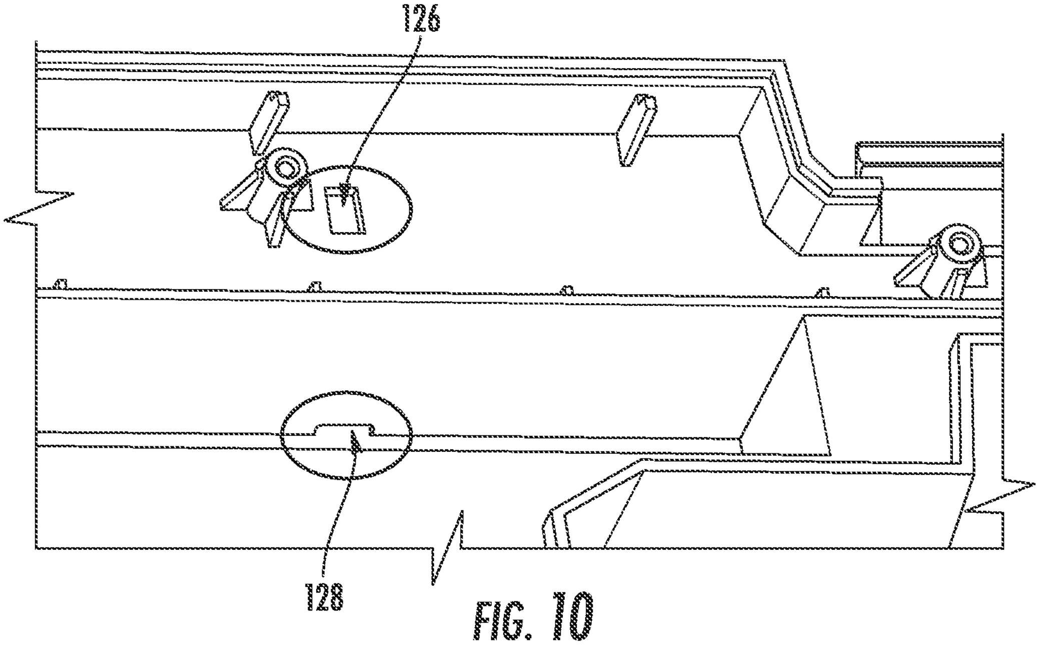
FIG. 10 is a detailed perspective view of the portion of the vacuum identified in FIG. 9, according to an exemplary embodiment.

Covering panel 120 is coupled to a top surface of panel 36 as shown in FIG. 8. Drain hole 124 is located within compartment 48 and drain holes 122, 126 and 128 are defined by panel 36. When covering panel 120 is removed from panel 36, then drain holes 122, 126 and 128 are exposed.

Drain holes 122, 124, 126, and 128, provide fluid communication between an interior of housing 12 and an exterior of vacuum 10, thus permitting debris and liquids, such as water, to egress from vacuum 10. For example, if top panel 18 is pivoted open and panel 36 is exposed, rain or other liquids land on panel 36. Without a means for the liquid to exit vacuum 10, the liquid may eventually navigate into other portions of vacuum 10, such as near battery 38, and cause damage. Providing avenues for debris and liquid to exit vacuum 10 helps protect the vacuum accessories, battery 38, electronics (e.g., control and power circuitry), the motor of vacuum 10, and/or other critical components. In various embodiments drain holes are arranged around the entire periphery of panel 36, such as every 2-3 inches.

Figure 11:
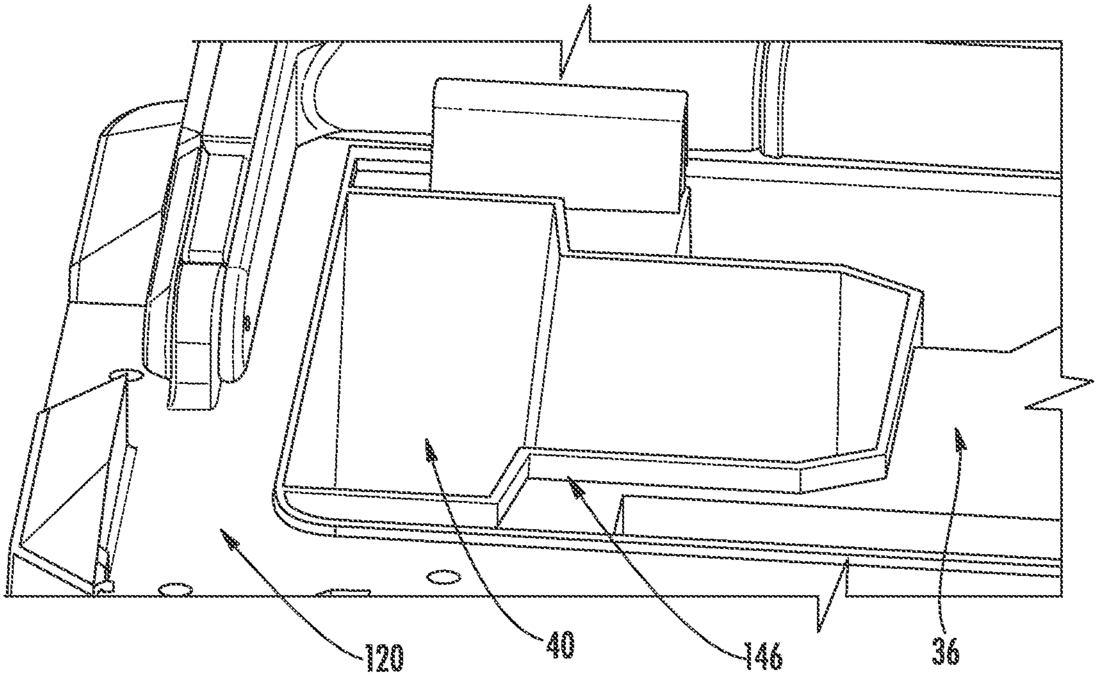
FIG. 11 is a perspective view of several components of the vacuum of FIG. 1, according to an exemplary embodiment.
Figure 12:
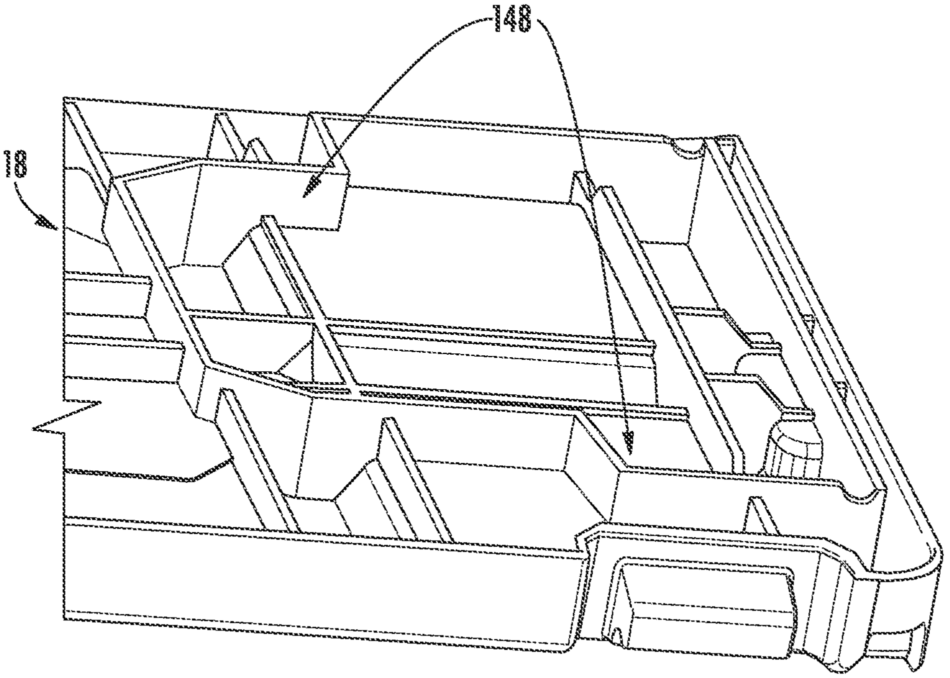
FIG. 12 is a perspective view of several components of the vacuum of FIG. 1, according to an exemplary embodiment.
Figure 13:
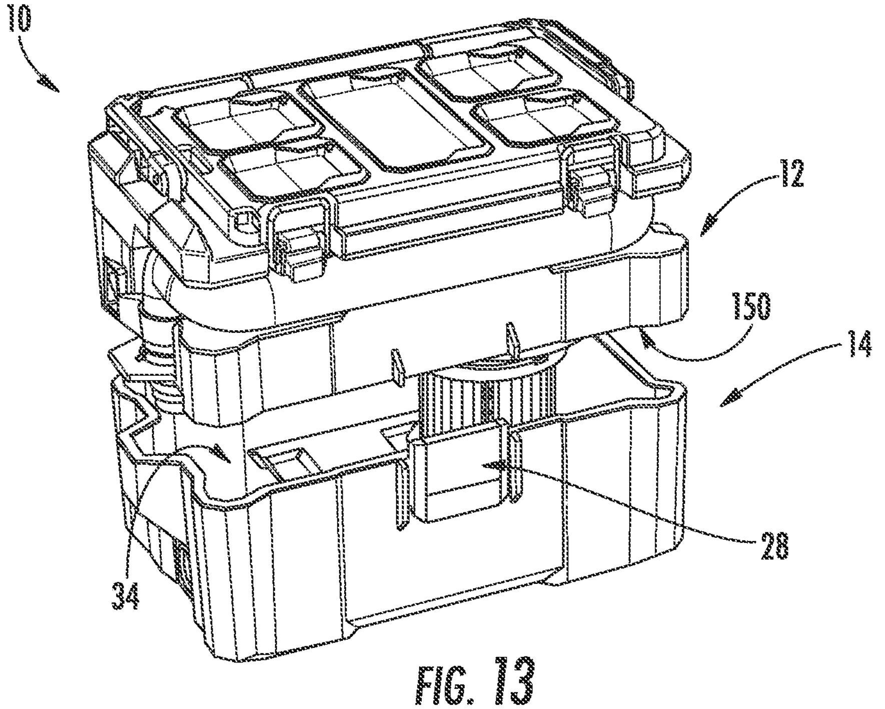
FIG. 13 is a perspective view of the vacuum of FIG. 1, according to an exemplary embodiment.
Figure 14:
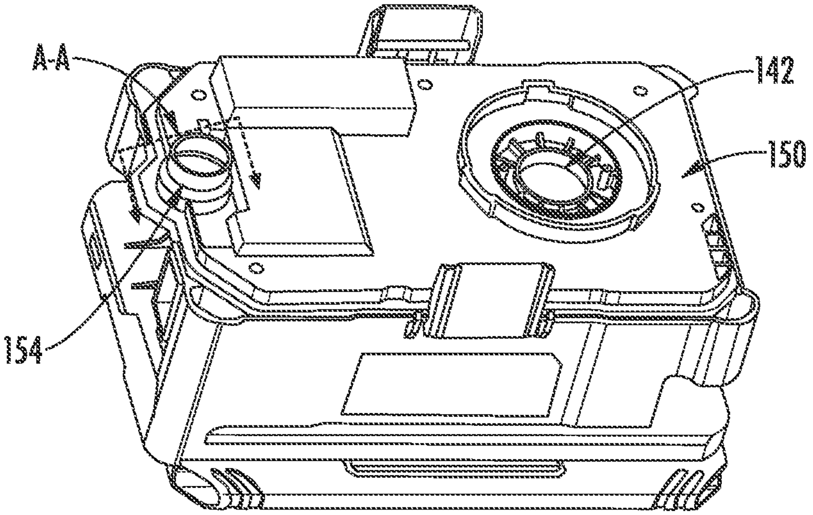
FIG. 14 is a perspective view of several components of the vacuum of FIG. 1, according to an exemplary embodiment.
Figure 15:
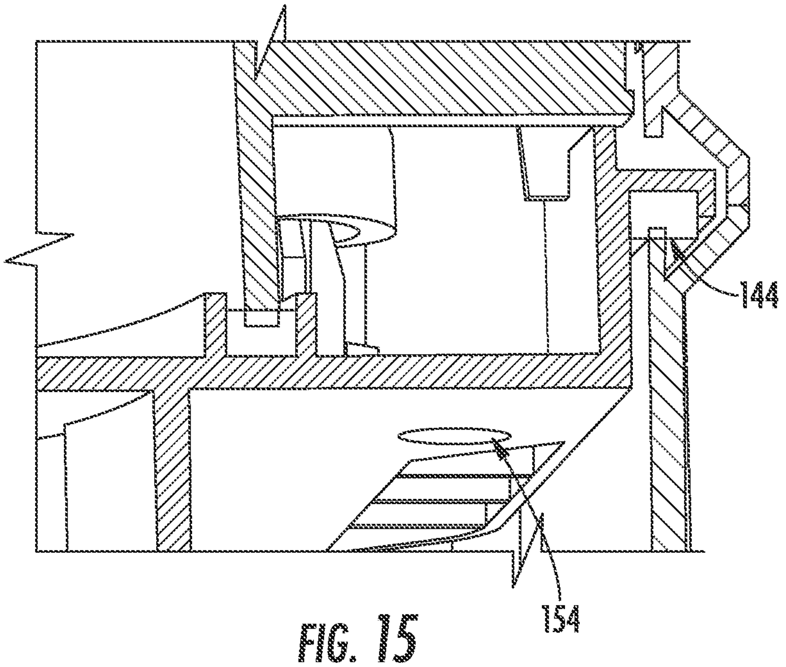
FIG. 15 is a perspective view of FIG. 14 along line A-A in FIG. 14, according to an exemplary embodiment.

Turning to FIGS. 11-12, various aspects of vacuum 10 are shown. Panel 36 includes rib 146, which protrudes upwardly from panel 36 around battery 38. Rib 146 helps protect battery compartment 40 from debris and liquids. Top panel 18 includes rib 148, which protrudes downwardly from top panel 18. Rib 148 of top panel 18 is sized to fit around rib 146 of panel 36 such that the lower surface of rib 148 is largely if not entirely below the upper surface of rib 146. In various embodiments, rib 148 provides a friction seal against rib 146, which helps protect battery compartment 40 from debris and liquids.

Turning to FIGS. 13-18, various aspects of the inlet into and the outlet from compartment 34 are shown. In a specific embodiment, housing of vacuum 10 includes upper housing 12 and lower housing 14. Upper housing 12 is detachable from lower housing 14, such as when latch 28 is decoupled. Lower housing 14 defines compartment 34, which in a specific embodiment has a volume of 2 gallons. When vacuum 10 is in use, air, liquid and debris enter compartment 34 via hose 26, which is coupled to inlet 154. Hose 26 is thus in fluid communication with compartment 34. Air exits compartment 34 via outlet 142 when vacuum is in use and the motor is operating. Housing 12 defines inlet 154 and outlet 142, each of which provide fluid communication between compartment 34 and an exterior of housing 12. Panel 150 is coupled to the bottom of upper housing 12. When upper housing 12 is coupled to lower housing 14, panel 150 defines the top of compartment 34.

When lower housing 14 and upper housing 12 are coupled, the interface between lower housing 14 and upper housing 12 provides a liquid-resistant seal, such as a face seal at gasket 144, to secure debris and liquid within compartment 34. In a specific embodiment, gasket 144 is formed from a foam and/or other elastomer and extends around the upper periphery of compartment 34.

Figure 16:
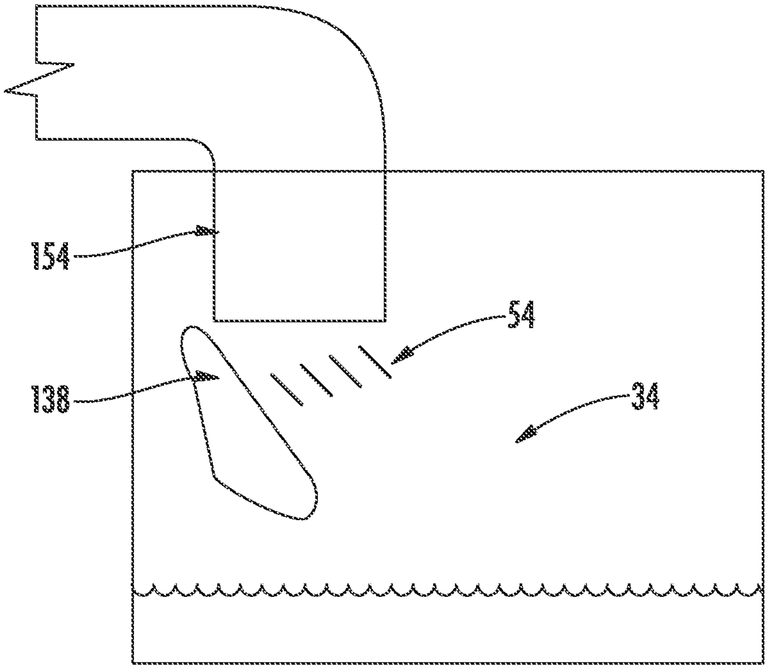
FIG. 16 is a schematic view of several components of the vacuum of FIG. 1, according to an exemplary embodiment.
Figure 17:
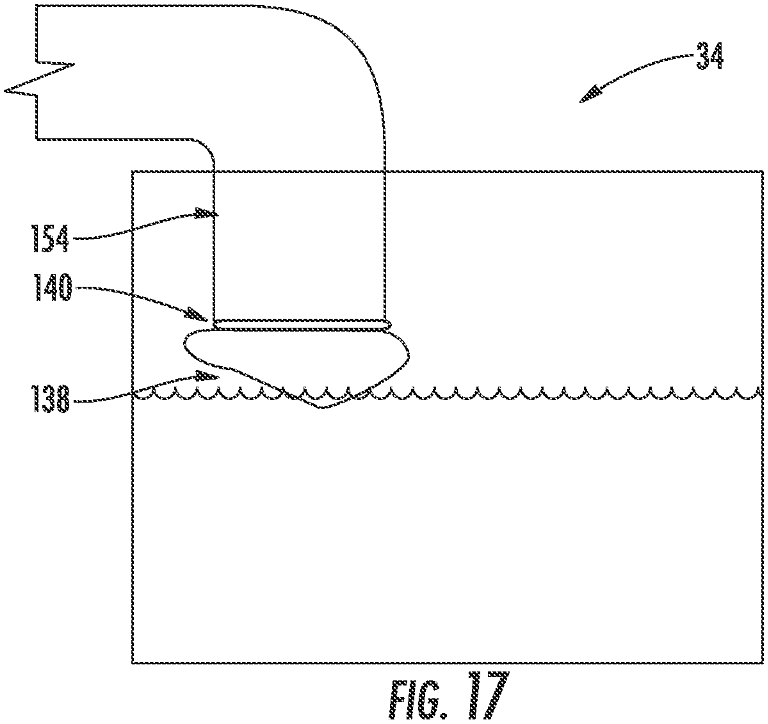
FIG. 17 is a schematic view of several components of the vacuum of FIG. 1, according to an exemplary embodiment.

Turning to FIGS. 16-17, air enters compartment 34 via air flow 54 through inlet 154. Air flow 54 forces an inlet stopping mechanism such as a stopper, shown as float 138, into the open position (best shown in FIG. 16). Float 138 is configured to interrupt fluid communication between compartment 34 and an exterior of the housing 12 when the motor is not operating. In various embodiments float 138 is biased towards sealing inlet 154 by being positioned in the closed position (e.g., via a spring) and/or float 138 is buoyant. As a result, when vacuum 10 is disengaged and air flow 54 stops, then float 138 closes over inlet 154 (best shown in FIG. 17). When float 138 is in the closed position, gasket 140 provides a more liquid-resistant seal between float 138 and inlet 154 than would be present without gasket 140. In a specific embodiment, gasket 140 is formed from a foam and/or other elastomer. In a specific embodiment, gasket 140 and float 138 are formed from a first material, such as a foam and/or other elastomer. In a specific embodiment, gasket 140 and float 138 are formed as a single part formed from a first material. In a specific embodiment, gasket 140 is formed from a first material and float 138 is formed from a second material different than the first material. In a specific embodiment gasket 140 and float 138 are formed as separate components. In various other embodiments the stopper over inlet 154 is not buoyant, unlike float 138.

Figure 18:
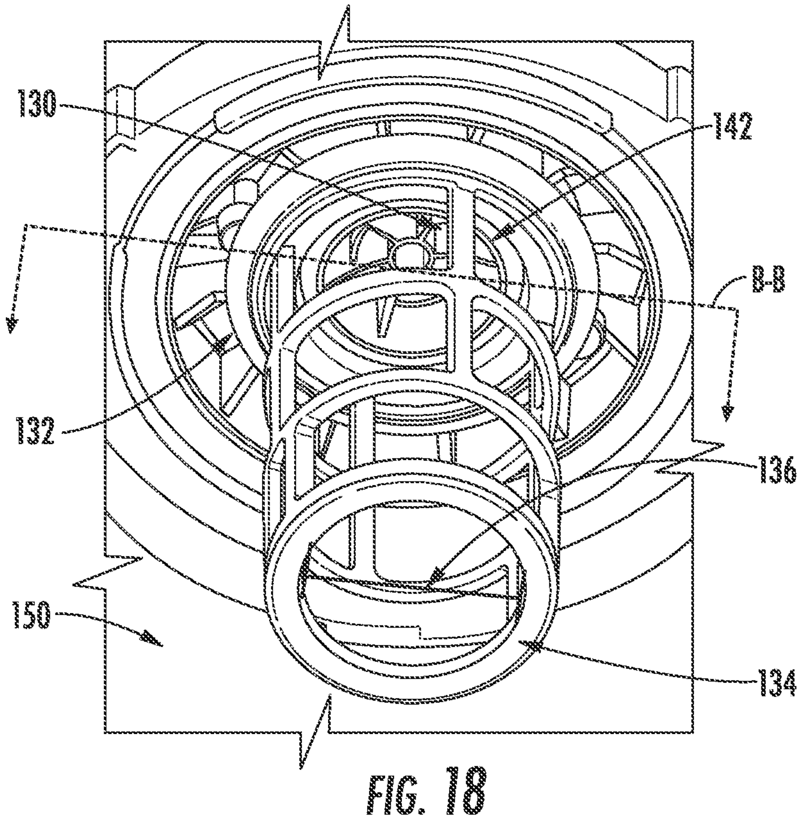
FIG. 18 is a perspective view of several components of the vacuum of FIG. 1, according to an exemplary embodiment.

Turning to FIG. 18, an outlet stopping mechanism, shown as cage 130 and a sealing ball constrained by cage 130, is configured to interrupt fluid communication between the compartment 34 and an exterior of the housing 12 when the motor is not operating. In a specific embodiment, the outlet stopping mechanism is biased towards sealing outlet 142. Cage 130 is coupled against a seal, shown as gasket 132, at outlet 142. Gasket 132 is disposed between cage 130 and housing 12. In a specific embodiment, gasket 132 interfaces against cage 130 and outlet 142, and cage 130 and outlet 142 do not interface against each other. Gasket 132 provides a tighter seal between cage 130 and panel 150, thus reducing the chance of debris or liquid escaping compartment 34 between cage 130 and panel 150. In a specific embodiment, gasket 132 is formed from a plastic and/or rubber material. In various embodiments cage 130 encloses a blocking device, such as a sealing ball that floats and is constrained by cage 130. In a specific embodiment, the sealing ball is formed from a plastic and/or rubber material. The diameter of the ball is less than diameter 136 of end 134 of cage 130, thus preventing the sealing ball from escaping cage 130. When compartment 34 fills with a liquid, the sealing ball rises towards outlet 142 and interfaces against gasket 132, providing a seal that inhibits and/or prevents liquid from escaping via outlet 142.

Figure 19:
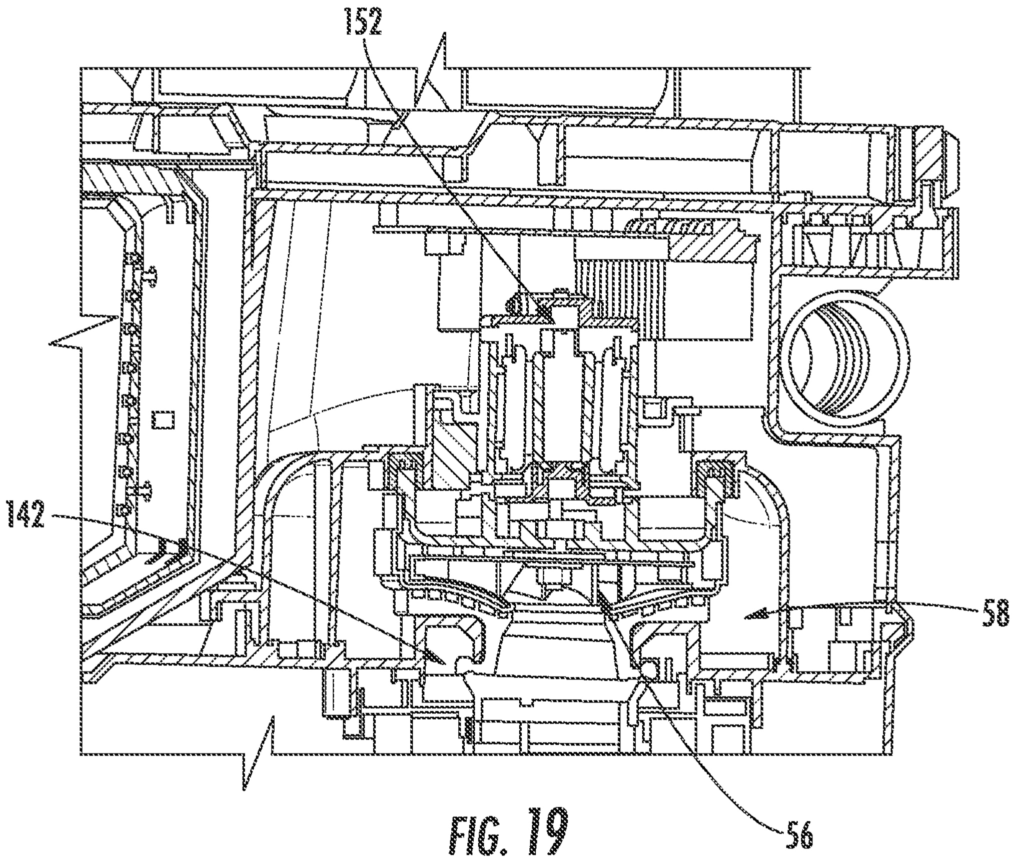
FIG. 19 is a perspective view of the cross-section B-B in FIG. 18, according to an exemplary embodiment.

Turning to FIG. 19, various aspects of motor 56 are shown. Circuit board 152 is located away from outlet 142 to reduce the likelihood of liquid that exits outlet 142 from damaging circuit board 152. In a specific embodiment, circuit board 152 is located at an opposite side of motor 56 from outlet 142.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:

1. A vacuum comprising:

a motor;

a housing that defines an internal compartment, wherein the housing defines an inlet through which debris enters the internal compartment when the motor is operating, and the housing further defines an outlet through which air exits the internal compartment when the motor is operating, wherein the inlet and the outlet are in fluid communication with an exterior of the housing, wherein the housing includes an interface configured to couple the vacuum to a modular tool storage device;

an inlet stopping mechanism configured to interrupt fluid communication between the internal compartment and the exterior of the housing via the inlet when the motor is not operating, wherein the inlet stopping mechanism is biased towards sealing the inlet; and an outlet stopping mechanism configured to interrupt fluid communication between the internal compartment and the exterior of the housing via the outlet when the motor is not operating, wherein the outlet stopping mechanism is biased towards sealing the outlet.

2. The vacuum of claim 1, the vacuum further comprising:

a switch configured to toggle whether the motor is operating, wherein the switch is coupled to a first face of the housing; and a hose in fluid communication with the inlet, wherein the hose is coupled to the first face of the housing.

3. The vacuum of claim 1, further comprising a second compartment configured to house a vacuum utility tool.

4. The vacuum of claim 1, further comprising a top panel pivotally coupled to the housing, wherein when the top panel is opened the second compartment is accessible.

5. The vacuum of claim 1, wherein the inlet stopping mechanism comprises:

a stopper; and a gasket configured to provide a liquid-resistant seal between the stopper and the inlet.

6. The vacuum of claim 5, wherein the stopper is configured to be buoyant.

7. The vacuum of claim 1, further comprising:

a top panel pivotally coupled to the housing, the top panel including a rib that extends downwardly; and an internal panel that is exposed when the top panel is opened, the internal panel including a rib that extends upwardly towards the top panel, wherein the rib of the top panel is sized to fit around the rib of the internal panel.

8. The vacuum of claim 7, further comprising a battery located within the rib of the internal panel.

9. A vacuum comprising:

a motor;

a housing that defines an internal compartment, wherein the housing defines an inlet through which debris enters the internal compartment when the motor is operating, and the housing further defines an outlet through which air exits the internal compartment when the motor is operating, wherein the inlet and the outlet are in fluid communication with an exterior of the housing, and wherein the housing includes an interface configured to couple the vacuum to a modular tool storage device;

an outlet stopping mechanism configured to interrupt fluid communication between the internal compartment and the exterior of the housing via the outlet when the motor is not operating; and a seal disposed between the outlet stopping mechanism and the housing.

10. The vacuum of claim 9, wherein the outlet stopping mechanism comprises a cage and a ball constrained by the cage, and wherein the seal interfaces against both the cage and the housing.

11. The vacuum of claim 9, wherein the housing includes an upper housing and a lower housing that are detachably coupled together.

12. The vacuum of claim 11, further comprising a gasket configured to provide a liquid-resistant seal between the upper housing and the lower housing.

13. The vacuum of claim 9, further comprising a plurality of drain holes that provide fluid communication between an interior of housing and the exterior of the housing.

14. The vacuum of claim 13, further comprising a battery configured to provide power to the motor.

* * * * *